United States Patent

Akiyoshi et al.

[11] Patent Number: 5,826,623
[45] Date of Patent: Oct. 27, 1998

[54] HIGH PRESSURE HOSE FOR REFRIGERANT

[75] Inventors: Koji Akiyoshi, Kasugai; Noriaki Imaeda, Komaki; Tetsuya Arima, Kasugai, all of Japan

[73] Assignee: Tokai Rubber Industries, Ltd., Komaki, Japan

[21] Appl. No.: 760,136

[22] Filed: Dec. 3, 1996

Related U.S. Application Data

[63] Continuation-in-part of Ser. No. 638,930, Apr. 26, 1996, abandoned.

[51] Int. Cl.⁶ ............................................. F16L 11/10
[52] U.S. Cl. ........................... 138/126; 138/130; 138/153
[58] Field of Search ................................ 138/123, 124, 138/125, 126, 127, 130, 153

[56] References Cited

U.S. PATENT DOCUMENTS

| | | | |
|---|---|---|---|
| 4,157,181 | 6/1979 | Cecka | 138/130 |
| 4,343,333 | 8/1982 | Keister | 138/126 |
| 4,384,595 | 5/1983 | Washkewicz et al. | 138/124 |
| 4,420,018 | 12/1983 | Brown, Jr. | 138/124 |
| 4,693,281 | 9/1987 | Creedon | 138/130 |
| 4,898,212 | 2/1990 | Searfoss et al. | 138/124 |
| 5,016,675 | 5/1991 | Igarashi et al. | 138/125 |
| 5,264,262 | 11/1993 | Igarashi | 138/125 |
| 5,488,974 | 2/1996 | Shiota et al. | 138/125 |

*Primary Examiner*—Denise L. Ferensic
*Assistant Examiner*—James F. Hook
*Attorney, Agent, or Firm*—Armstrong, Westerman, Hattori, McLeland & Naughton

[57] ABSTRACT

A high pressure hose for refrigerant made up of
  an internal resin tube;
  an inner rubber layer, which is applied to an outer circumference thereof;
  a first reinforcing layer comprising a first splicing yarn, which is spirally wound around an outer circumference thereof;
  a second reinforcing layer comprising a second splicing yarn, which is spirally wound in the opposite direction to the first reinforcing layer around an outer circumference thereof; and,
  an outer rubber layer, which is applied to an outer circumference thereof,
  the inner rubber layer comprising rubber material whose 50% modulus $M_{50}$ at a temperature of 135° C. is 20 to 40 kgf/cm².

5 Claims, 1 Drawing Sheet

HIGH PRESSURE HOSE FOR REFRIGERANT

This application is a continuation-in-part of application Ser. No. 08/638,930 filed Apr. 26, 1996, now abandoned.

TECHNICAL FIELD

The present invention relates to a high pressure hose for refrigerant which is used for a freon hose and the like in the piping systems of automobiles, especially a high pressure hose for refrigerant wherein a reinforcing layer is spirally wound.

BACKGROUND OF THE INVENTION

In the piping systems of vehicles such as automobiles, a hose containing a reinforcing layer comprising splicing yarn is used for positions where pressure proof property and durability are required. The reinforcing layer is formed by braiding or winding fiber or metallic splicing yarn spirally. To reduce cost, the spiral winding structure is more common.

In the spiral winding structure, to prevent a hose from twisting, a first reinforcing layer comprising splicing yarn which is wound spirally and a second reinforcing layer comprising splicing yarn which is spirally wound in the opposite direction to the first reinforcing layer are usually laminated. As an example for a piping hose having such a spiral winding structure, there are a low pressure hose used at a low pressure about 4 kgf/cm$^2$, as a maximum operating pressure and a high pressure hose used at a high pressure about 20 kgf/cm$^2$ as a maximum operating pressure.

In the low pressure hose, the braid density of the reinforcing layer is less than 45%, which is very low, and the operating pressure is low so that the two reinforcing layers are often directly laminated. In the meantime, in the high pressure hose, the braid density of the reinforcing layer is about 70 to 90%, which is high, intervention of an intermediate rubber layer is indispensable to improve bonding ability of the two reinforcing layers and prevent mutual abrasion so as to increase durability.

A freon hose and the like for refrigerant well known as such a high pressure hose comprises, as shown in FIG. 2, an internal resin tube 1 formed by synthetic resin such as polyamide or the like which is stable for refrigerant, an inner rubber layer 2, which is applied to an outer circumference thereof, a first reinforcing layer 3 comprising splicing yarn 3a which is spirally wound thereon, an intermediate rubber layer 4, which is applied to an outer circumference thereof, a second reinforcing layer 5 comprising splicing yarn 5a which is spirally wound thereon in the opposite direction of the first reinforcing layer, and an outer rubber layer 6, which is applied to an outer circumference thereof.

However, if an intermediate rubber layer 4 intervenes between the two reinforcing layers, as shown in FIG. 3, rubber of the inner rubber layer 2 spouts out among splicing yarn 3a of the first reinforcing layer 3 and flows in the direction toward the intermediate rubber layer 4 because of expansion of the inner rubber layer 2 and contraction of the splicing yarn 3a in vulcanization, which often results in so-called "slip". That is, the splicing yarn 3a of the first reinforcing layer 3 falls toward the inner rubber layer 2. If the braiding structure of the splicing yarn 3a is disarranged, pressure proof property on such a spot may deteriorate and burst therefrom.

To prevent slip, it has been thought that the intermediate rubber layer was got rid of. However, if the intermediate rubber layer does not exist, there was a fear that durability might deteriorate because the two reinforcing layers might separate on the interlayer therebetween due to the deterioration of the bonding ability or the two directly laminated reinforcing layers might be rubbed each other and worn away. Therefore, this was not practical especially in the high pressure hose for refrigerant.

SUMMARY OF THE INVENTION

It is an object of the present invention to provide a high pressure hose for refrigerant having a simple structure without an intermediate rubber layer between two reinforcing layers which are spirally wound, with no slip of the splicing yarn occurred, and having pressure proof property and durability at the same level as those of the prior hose having an intermediate rubber layer.

In order to achieve the above object, a high pressure hose for refrigerant in the present invention comprising:

an internal resin tube;

an inner rubber layer, which is applied to an outer circumference thereof;

a first reinforcing layer comprising a first splicing yarn, which is spirally wound around an outer circumference thereof;

a second reinforcing layer comprising a second splicing yarn, which is spirally wound in the opposite direction to the first splicing yarn around an outer circumference thereof; and, an outer rubber layer, which is applied to an outer circumference thereof, said inner rubber layer comprising rubber material whose 50% modulus $M_{50}$ at a temperature of 135° C. is 20 to 40 kgf/cm$^2$.

According to the present invention, unexpected effects could be realized, That is, cost reduction can be realized by making it a simple structure by deleting the intermediate rubber layer between the two reinforcing layers which are spirally wound, and also superior pressure proof property and durability can be realized without the intermediate rubber layer by adopting rubber material high at 50% modulus for the inner rubber layer.

In a conventional high pressure hose for refrigerant, a switch to substitute refrigerant has been promoted as a countermeasure for regulations on specific chlorofluoro carbon refrigerant and HFC-134a has become prevalant use for car air conditioner and the like. Since the HFC-134a is high in hygroscopicity, butyl rubber (IIR) superior in moisture transmission resistance is employed as an inner rubber layer to carry it.

However, IIR is generally low in high tempreature modulus, specifically about 10 to 20 kgf/cm$^2$ at $M_{50}$ of 50% modulus at 135° C. For this reason, it is thought that an inner rubber layer comprising IIR may easily flow in vulcanization, which is a major cause of a slip.

On the other hand, according to the present invention, such rubber as is 20 to 40 kgf/cm$^2$ at $M_{50}$ of 50% modulus at 135° C. is employed as a rubber material for an inner rubber layer. Therefore, the inner rubber layer may hardly flow in vulcanization, which restrains a slip effectively.

Besides, the intervention of an intermediate rubber layer between two reinforcing layers makes the difference in diameters between the first inner reinforcing layer and the second outer reinforcing layer bigger. As a result, there is non-uniformity caused in braid density or bursting pressure if the two reinforcing layers are braided with the same number of splicing yarn. The hose twists with the internal pressure because of this non-uniformity so as to deteriorate pressure proof property and durability.

However, since there is no intermediate rubber layer in the high pressure hose according to the present invention, the difference of diameters between the two reinforcing layers becomes just the diameter of the second splicing yarn. The braid density and bursting pressure between the two reinforcing layers become greatly similar. For this reason, when the internal pressure is applied, a change by twist may be minimized, resulting in so much improvement on pressure proof property and durability thereby. This is thought to make up for the decreases in the pressure proof property and durability caused by getting rid of the intermediate rubber layer. In addition, since such rubber as is 20 to 40 kgf/cm$^2$ of $M_{50}$ is employed for the inner rubber layer, the difference of diameters can be minimized when internal pressure is applied thereto.

Thus, there is no slip of the first splicing yarn caused in the high pressure hose for refrigerant according to the present invention, resulting in sufficient pressure proof property and durability. Moreover, the intervals among the splicing yarn can be maintained almost uniformly so that stress does not concentrate on the spots with wide interval. As mentioned above, it was thought that 70% braid density is at least required for sufficient bursting pressure. However, it can be reduced to 50% in the present invention. The maximum braid density is 90% same as the conventional one.

Meanwhile, on the contrary to the conventional common sense, in spite that the intermediate rubber layer does not exist between the two reinforcing layers, sufficient binding force therebetween can be obtained because rubber material of the inner rubber layer or the outer rubber layer may invade in texture of the splicing yarn to be filled so that peeling may hardly occur between the reinforcing layers, which is unexpected effect. Further, since the two reinforcing layers are combined by sufficient binding force, it is confirmed that abrasion of the splicing yarn is extremely low.

However, since it was found out that durability of the high pressure hose for refrigerant in the present invention decreases when being employed as a bend hose with small bend radius. Therefore, it is preferable that this hose is used as a hose with bend radius of not less than 70 mm.

Furthermore, as for each material comprising the high pressure hose for refrigerant in the present invention, such materials as have been conventionally employed for the similar high pressure hose for refrigerant except that the inner rubber layer may be used. For example, polyamide resin such as nylon, polyester resin or the like may be employed for the internal resin tube. EPDM, IIR, CR, CPE or the like may be employed for the outer rubber layer.

Still furthermore, fiber such as polyester fiber may be employed for the splicing yarn in the reinforcing layer. Especially, polyethylene terephthalate fiber is preferable among all. In addition, to obtain superior durability, aramid or polyethylene naphthalate fiber or the like, which are superior in strength and elongation, may be employed.

EXAMPLE 1

Figure 1:
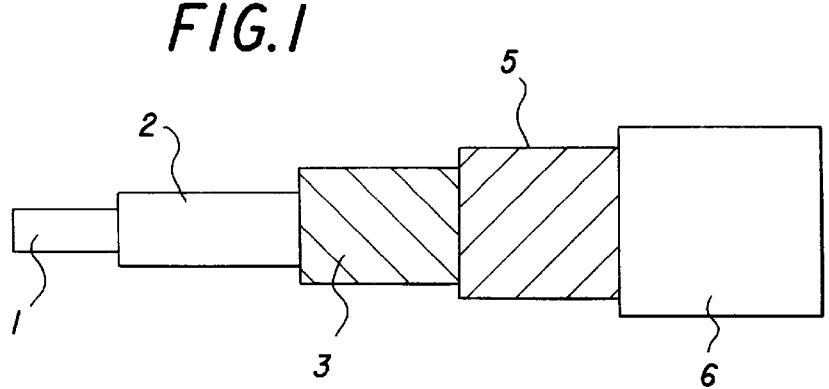
FIG. 1 is a partial cutaway side view of the laminate structure of a high pressure hose for refrigerant in one embodiment according to the present invention.
Figure 2:
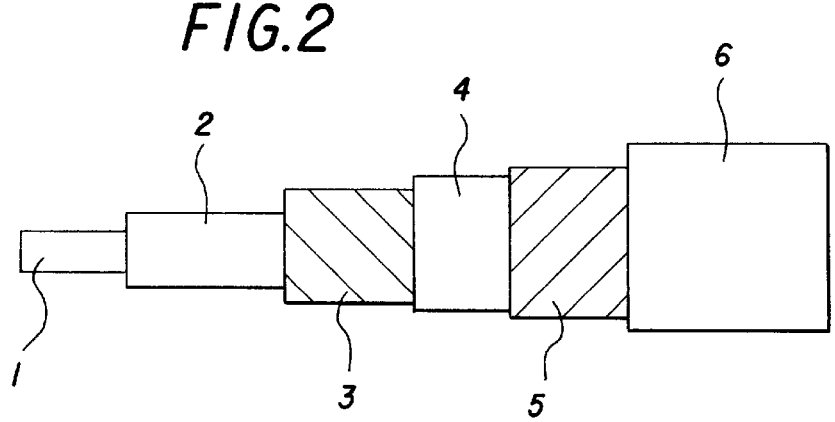
FIG. 2 is a partial cutaway side view of the laminate structure of a conventional high pressure hose for refrigerant.
Figure 3:
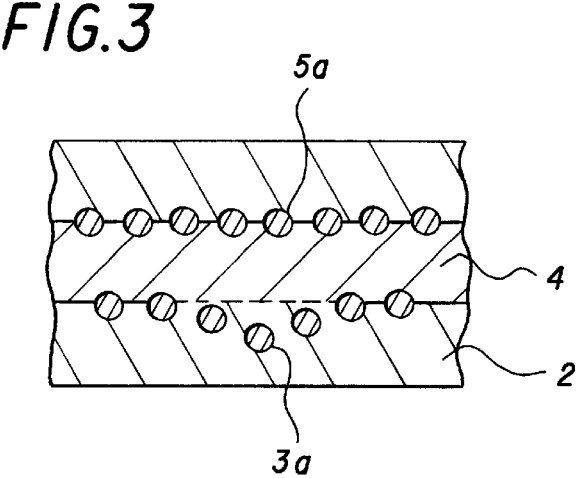
FIG. 3 is a a partial cutaway view to illustrate slip caused on the splicing yarn of the hose.

Plural hoses were made by laminating an inner rubber layer 2, a first reinforcing layer 3, a second reinforcing layer 5 and an outer rubber layer 6 on an outer circumference of an internal resin tube 1 in order and varying the rubber material for the inner rubber layer 2 into chlorinated butyl rubber (C1-IIR), or butyl rubber(IIR), or the like as shown in the following table 1.

In addition, a first splicing yarn 3a and a second splicing yarn 5a are spirally wound on the first reinforcing layer 3 and the second reinforcing layer 5 respectively wherein each of the first and the second splicing yarn 3a and 5a is aligned in parallel, respectively.

However, in every hose, the internal resin tube 1 was formed by nylon 6/olefinic elastomer blended resin in 0.15 thickness and the outer rubber layer 6 was formed by EPDM in 1.5 mm thickness. At that time, the first and the second splicing yarn 3a and 5a of the first and second reinforcing layers 3 and 5 were braided by employing 18 pieces of 4000 denier of polyester filament yarn and wrapping the two reinforcing layers in the opposite direction each other. In addition, the braid density of the first reinforcing layer 3 is arranged to be 53%, that of the second reinforcing layer 5 is 51%, while the bursting pressure of the first reinforcing layer 3 is arranged to be 176 kgf/cm$^2$ and that of the second reinforcing layer 5 is 167 kgf/cm$^2$. In addition, the number of the splicing yarn means the number of the splicing yarn let out of a bobbin mounted on a deck of a spiral apparatus.

TABLE 1

| RUBBER MATERIAL | Cl CONTENT (%) | AMOUNT OF CARBON BLACK (WEIGHT PARTS/100 WEIGHT PARTS IIR) | 50% MODULUS at 135° C. $M_{50}$ (kgf/cm$^2$) |
| --- | --- | --- | --- |
| A* | 0 | 55 | 15.1 |
| B* | 0.3 | 55 | 18.4 |
| C | 1.2 | 55 | 23.9 |
| D | 0.96 | 75 | 26.2 |
| E | 0.96 | 85 | 33.1 |
| F | 0.96 | 95 | 39.8 |

(NB)
*The samples marked with * are comparative examples.

Presence or absence of slip of the first splicing yarn 3a in the first reinforcing layers of thus obtained hoses was examined. In case that the first splicing yarn 3a was aligned in a line with no slip, the evaluation is ○. In case that the width of slip (moved distance of the first splicing yarn 3a in the direction to thickness of the hose) is less than the diameter of the first splicing yarn 3a, the evaluation is Δ. In case that the width of slip is not less than the diameter of the first splicing yarn 3a, the evaluation is x.

Further, bursting pressure both at a room temperature and a high temperature (120° C.) and durability against repeated pressure were examined on each hose. The results are shown in the following table 2. In each case, a hose in 500 mm length was employed. The hose was bent in an arc so that the distance of both centers before and after being bent. Then the hose was fixed on its ends by metal fittings for pressurization, In such a state, evaluation was conducted. The specific evaluation of bursting pressure was that the hose is maintained at a room temperature or 120° C. and internal pressure was raised from 50 kgf/cm$^2$ by every 10 kgf/cm$^2$ and was maintained for one minute in each case, thereby the pressure when the hose burst was measured. In the meantime, durability was valued by applying internal pressure at 0 kgf/cm² to 54 kgf/cm² at an oil temperature 135° C. with 30 cpm repeatedly and counting the number of such cycles until the hose burst.

TABLE 2

| | BURSTING PRESSURE | | | |
|---|---|---|---|---|
| RUBBER MATERIAL | (kgf/cm²) ROOM TEMPERATURE | 120° C. | DURABILITY NO. OF CYCLES | SLIP |
| A* | 150 | 80 | 70,000 | ○ |
| B* | 190 | 90 | 100,000 | ○ |

TABLE 2-continued

| | BURSTING PRESSURE | | | |
|---|---|---|---|---|
| RUBBER MATERIAL | (kgf/cm²) ROOM TEMPERATURE | 120° C. | DURABILITY NO. OF CYCLES | SLIP |
| C | 220 | 100 | 180,000 | ○ |
| D | 270 | 120 | 250,000 | ○ |
| E | 300 | 130 | 310,000 | ○ |
| F | 310 | 130 | 340,000 | ○ |

(NB)
*The samples marked with * are comparative examples.

As shown from the above results, in case of the hose having the spiral structure without the intermediate rubber layer, every hose according to the present invention wherein rubber material of the inner rubber layer is in the range of 20 to 40 kgf/cm² at 50% modulus of 135° C. showed no slip, not less than 200 kgf/cm² of bursting pressure at a room temperature and not less than 100 kgf/cm² of that at 120° C., and not less than 150,000 cycles of durability. On the other hand, comparative examples having the above $M_{50}$ showed inferiority in durability and pressure proof property.

EXAMPLE 2

Except that rubber material C shown in the table 1 of the above example 1 was employed as an inner rubber layer, the number of denier of the splicing yarn was varied, the numbers of the first and the second splicing yarn, braid density and bursting pressure in the first reinforcing layer and the second reinforcing layer were designed in accordance with the following table 3 respectively, hoses were prepared with the rest of the conditions being the same as that of example 1. In addition, samples 1 to 6 adopted polyester filament yarn same as example 1, however, sample 7 adopted aramid fiber.

Besides, for comparison, hoses as comparative examples (samples 8 and 9) were prepared by arranging an intermediate rubber layer comprising rubber material C shown in the table 1 in 0.3 mm thickness, although they were the same structure as example 2 (the same material was adopted for the inner rubber layer and the intermediate rubber layer). Thus obtained hoses were evaluated in the same way as example 1 and the results are shown in the following table 4.

TABLE 3

| | | FIRST REINFORCING LAYER | | | SECOND REINFORCING LAYER | | |
|---|---|---|---|---|---|---|---|
| SAMPLE | DENIER | No. | DENSITY | BURSTING PRESSURE | No. | DENSITY | BURSTING PRESSURE |
| 1 | 3000 | 24 | 57 | 156 | 24 | 54 | 149 |
| 2 | 3000 | 28 | 66 | 182 | 30 | 67 | 186 |
| 3 | 4000 | 22 | 65 | 215 | 22 | 62 | 204 |
| 4 | 4000 | 26 | 77 | 254 | 28 | 79 | 260 |
| 5 | 5000 | 14 | 52 | 174 | 16 | 56 | 189 |
| 6 | 6000 | 18 | 74 | 266 | 20 | 78 | 281 |
| 7 | 4000 | 18 | 53 | 185 | 18 | 51 | 175 |
| 8* | 3000 | 32 | 78 | 213 | 32 | 72 | 198 |
| 9* | 4000 | 28 | 85 | 280 | 28 | 79 | 260 |

(NB)
*The samples marked with * are comparative examples and the sample 7 is aramid fiber.

TABLE 4

| | BURSTING PRESSURE (kgf/cm³) | | DURABILITY NO. OF | |
|---|---|---|---|---|
| SAMPLE | ROOM TEMPERATURE | 120° C. | CYCLES | SLIP |
| 1 | 210 | 100 | 170,000 | ○ |
| 2 | 310 | 140 | 290,000 | ○ |
| 3 | 250 | 110 | 280,000 | ○ |
| 4 | 420 | 160 | 410,000 | ○ |
| 5 | 320 | 130 | 360,000 | ○ |
| 6 | 350 | 150 | 390,000 | ○ |
| 7 | 250 | 110 | 270,000 | ○ |
| 8* | 260 | 120 | 80,000 | × |
| 9* | 350 | 150 | 130,000 | Δ |

(NB)
*The samples marked with * are comparative examples and the sample 7 is aramid fiber.

As shown from the above results, it was found out that every hose of samples 1 to 7 according to the present invention caused no slip and was superior in pressure proof property and durability, especially that samples 2, 4, 5 and 6 where the numbers of the splicing yarn between the first reinforcing layer and the second reinforcing layer were different and braid densities therebetween were arranged similarly. On the other hand, it was found out that samples 8 and 9 having the intermediate rubber layer, which were the same structure as that of a conventional hose, caused slip and were inferior in durability.

EFFECTS OF THE INVENTION

The hose of the present invention has a simple structure without an intermediate rubber layer between two reinforcing layers which are wound spirally, respectively, so as to cause no slip of the splicing yarn and also minimize change in diameter of the hose or twist, resulting in a high pressure hose for refrigerant having pressure proof property and durability same as those of the conventional hose having an intermediate rubber layer at a low cost.

Moreover, the high pressure hose for refrigerant of the present invention is provided with sufficient pressure proof property and durability also because there is sufficient binding force between the two reinforcing layers, on the contrary to the conventional common sense, in spite of no intermediate rubber layer so that peeling between the layers may hardly occur and be less in abrasion among splicing yarn.

What is claimed is:

1. A high pressure hose for refrigerant comprising:

an internal resin tube;

an inner rubber layer, which is applied to an outer circumference of the internal resin tube;

a first reinforcing layer comprising first splicing yarn, which is formed by spirally winding said first splicing yarn around an outer circumference of the inner rubber layer in a spiral braid density A of not less than 50% and less than 90%;

a second reinforcing layer comprising second splicing yarn, which is formed by spirally winding said second splicing yarn in the opposite direction to the first splicing yarn around and directly upon an outer circumference of the first reinforcing layer in a spiral braid density B of not less than 50% and less than 90%; and, an outer rubber layer, which is applied to an outer circumference of the second reinforcing layer, wherein the second splicing yarn forming the second reinforcing layer has a number more than that of the first splicing yarn forming the first reinforcing layer, whereby the spiral braid density A of the first reinforcing layer and the spiral braid density B of the second reinforcing layer are similar in not more than 4% difference, and the spiral braid density B of the second reinforcing layer is higher than the spiral braid density A of the first reinforcing layer.

2. A high pressure hose for refrigerant according to claim 1, wherein a material for forming the inner rubber layer is chlorinated butyl rubber.

3. A high pressure hose for refrigerant according to claim 1, wherein the first and the second splicing yarn for forming the first reinforcing layer and the second reinforcing layer is one kind selected from the group consisting of polyester fiber, polyethylene terephthalate fiber, aramid fiber and polyethylene naphthalate fiber.

4. A high pressure hose for refrigerant according to claim 1, wherein the first and the second splicing yarn have a yarn number count in the range of 3,000 to 6,000 denier.

5. A high pressure hose for refrigerant according to claim 1, wherein said inner rubber layer comprises rubber material whose 50% modulus at a temperature of 135° C. is 20 to 40 kgf/cm$^2$.

* * * * *